US012145242B2

(12) United States Patent
Winterhalter et al.

(10) Patent No.: US 12,145,242 B2
(45) Date of Patent: Nov. 19, 2024

(54) METHOD FOR DETECTING A FIRST OPERATING STATE OF A HANDHELD POWER TOOL

(71) Applicant: Robert Bosch GmbH, Stuttgart (DE)

(72) Inventors: Juergen Winterhalter, Stuttgart (DE); Simon Erbele, Nufringen (DE); Tobias Zibold, Stuttgart (DE); Stefan Mock, Remshalden (DE); Wolfgang Herberger, Stuttgart (DE); Dietmar Saur, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 359 days.

(21) Appl. No.: 17/441,818

(22) PCT Filed: Mar. 2, 2020

(86) PCT No.: PCT/EP2020/055397
§ 371 (c)(1),
(2) Date: Sep. 22, 2021

(87) PCT Pub. No.: WO2020/193083
PCT Pub. Date: Oct. 1, 2020

(65) Prior Publication Data

US 2022/0176527 A1 Jun. 9, 2022

(30) Foreign Application Priority Data

Mar. 25, 2019 (DE) ..................... 10 2019 204 071.3

(51) Int. Cl.
*B25B 23/147* (2006.01)
*B25B 21/02* (2006.01)

(52) U.S. Cl.
CPC ........ *B25B 23/1475* (2013.01); *B25B 21/026* (2013.01)

(58) Field of Classification Search
CPC .......................... B25B 23/1475; B25B 21/026
(Continued)

(56) References Cited

U.S. PATENT DOCUMENTS 4,066,942 A * 1/1978 Bardwell ............... G05D 17/02 318/434
4,482,324 A * 11/1984 Wohlgemuth ......... A61B 9/005 433/29
(Continued)

FOREIGN PATENT DOCUMENTS

CN 101592712 A 12/2009
CN 102577092 A 7/2012
(Continued)

OTHER PUBLICATIONS

International Search Report corresponding to PCT Application No. PCT/EP2020/055397, mailed Jun. 29, 2020 (German and English language document) (7 pages).

*Primary Examiner* — Dariush Seif
(74) *Attorney, Agent, or Firm* — Maginot, Moore & Beck LLP

(57) ABSTRACT

Method for detecting a first operating state of a handheld power tool, wherein the handheld power tool has an electric motor. In this case, the method comprises the steps of: (S1) determining a signal of an operating variable of the electric motor; (S2) comparing the signal of the operating variable with at least one model signal waveform typical of the state, wherein the model signal waveform typical of the state is assigned to the first operating state; (S3) deciding whether the first operating state is present, wherein the decision at least partially depends on whether the model signal waveform typical of the state is identified in the signal of the operating variable in step S2. Additionally disclosed is a handheld power tool, particularly an impact driver, with an
(Continued)

electric motor and a control unit, wherein the control unit is designed to execute a method according to the disclosure.

19 Claims, 12 Drawing Sheets

(58) Field of Classification Search
USPC .............................................................. 173/1
See application file for complete search history.

(56) References Cited

U.S. PATENT DOCUMENTS

| | | | | | |
|---|---|---|---|---|---|
| 4,721,169 | A * | 1/1988 | Nagasawa | B25B 23/147 | 81/469 |
| 5,154,242 | A * | 10/1992 | Soshin | B25B 23/147 | 173/180 |
| 6,167,606 | B1 * | 1/2001 | Mueller | B23P 19/066 | 29/407.02 |
| 7,295,909 | B2 * | 11/2007 | Recknagel | B60R 21/013 | 340/436 |
| 7,424,920 | B2 * | 9/2008 | Bergstrand | E21B 19/16 | 173/4 |
| 11,731,256 | B2 * | 8/2023 | Yamada | B25D 17/24 | 173/48 |
| 2003/0089511 | A1 * | 5/2003 | Tsuneda | B25B 21/00 | 173/217 |
| 2004/0182588 | A1 * | 9/2004 | Tokunaga | B25B 23/1453 | 173/176 |
| 2005/0131415 | A1 * | 6/2005 | Hearn | B25B 23/147 | 606/80 |
| 2005/0167130 | A1 * | 8/2005 | Setter | B25B 23/1405 | 173/176 |
| 2006/0185869 | A1 * | 8/2006 | Arimura | B25B 23/1475 | 173/176 |
| 2009/0071673 | A1 * | 3/2009 | Zhong | B25B 21/008 | 173/217 |
| 2011/0067895 | A1 * | 3/2011 | Nobe | B25B 21/00 | 340/680 |
| 2011/0185864 | A1 * | 8/2011 | Ide | B25B 23/147 | 81/479 |
| 2011/0198103 | A1 * | 8/2011 | Suzuki | H02J 7/0048 | 173/46 |
| 2012/0169256 | A1 * | 7/2012 | Suda | B25D 16/003 | 318/17 |
| 2012/0234566 | A1 * | 9/2012 | Mashiko | B25B 21/02 | 173/93.5 |
| 2013/0228353 | A1 * | 9/2013 | Chen | B25B 23/1475 | 173/176 |
| 2014/0000921 | A1 * | 1/2014 | Vanko | B23Q 17/22 | 173/11 |
| 2014/0045653 | A1 | 2/2014 | Atsumi et al. | | |
| 2014/0102741 | A1 * | 4/2014 | Sekino | B25B 21/02 | 173/181 |
| 2014/0262390 | A1 * | 9/2014 | Arimura | B25B 21/02 | 173/7 |
| 2015/0021062 | A1 * | 1/2015 | Sekino | B25B 23/14 | 173/183 |
| 2015/0034349 | A1 * | 2/2015 | Proudlock | A01D 34/006 | 173/176 |
| 2015/0144365 | A1 * | 5/2015 | Hirabayashi | B25B 23/1405 | 173/2 |
| 2015/0150556 | A1 * | 6/2015 | McCuen | A61B 17/068 | 173/1 |
| 2015/0202758 | A1 * | 7/2015 | Nitsche | B25D 11/005 | 173/1 |
| 2015/0231770 | A1 * | 8/2015 | Kusakawa | B25B 21/02 | 173/93.5 |
| 2015/0231771 | A1 * | 8/2015 | Sakai | B25B 21/02 | 173/176 |
| 2015/0309640 | A1 * | 10/2015 | Vuckovic | G06F 3/04883 | 173/1 |
| 2016/0075004 | A1 * | 3/2016 | Tsubakimoto | B25B 21/026 | 173/93 |
| 2016/0325415 | A1 * | 11/2016 | Huber | B25B 23/1475 | |
| 2017/0144278 | A1 * | 5/2017 | Nishikawa | B25B 21/026 | |
| 2017/0190032 | A1 * | 7/2017 | Leong | B25B 23/1475 | |
| 2017/0217001 | A1 * | 8/2017 | Oishi | B25B 21/02 | |
| 2017/0246732 | A1 * | 8/2017 | Dey, IV | B25B 23/1475 | |
| 2017/0361449 | A1 * | 12/2017 | Goble | B25F 5/00 | |
| 2018/0290270 | A1 * | 10/2018 | Manasseh | H02P 6/32 | |
| 2018/0339385 | A1 * | 11/2018 | Yamamoto | B25B 21/02 | |
| 2019/0047131 | A1 * | 2/2019 | Ichikawa | B25B 21/02 | |
| 2019/0091824 | A1 * | 3/2019 | Chellew | F21V 23/0457 | |
| 2019/0111550 | A1 * | 4/2019 | Kato | B25F 5/00 | |
| 2020/0212505 | A1 * | 7/2020 | Nakano | H01M 10/48 | |
| 2020/0238486 | A1 * | 7/2020 | Huang | B25B 21/02 | |
| 2020/0384620 | A1 * | 12/2020 | Gaul | B25B 31/00 | |

FOREIGN PATENT DOCUMENTS

| | | | |
|---|---|---|---|
| CN | 104334318 | A | 2/2015 |
| CN | 105792992 | A | 7/2016 |
| DE | 10 2013 212 506 | A1 | 12/2014 |
| DE | 10 2014 011 643 | A1 | 2/2015 |
| EP | 1 398 119 | A1 | 3/2004 |
| EP | 2 599 589 | B1 | 4/2017 |
| EP | 3 381 615 | A1 | 10/2018 |
| JP | 2010-99765 | A | 5/2010 |
| WO | 2013/174594 | A1 | 11/2013 |

* cited by examiner

METHOD FOR DETECTING A FIRST OPERATING STATE OF A HANDHELD POWER TOOL

This application is a 35 U.S.C. § 371 National Stage Application of PCT/EP2020/055397, filed on Mar. 2, 2020, which claims the benefit of priority to Serial No. DE 10 2019 204 071.3, filed on Mar. 25, 2019 in Germany, the disclosures of which are incorporated herein by reference in their entirety.

The disclosure relates to a method for detecting a first operating state of a handheld power tool, and to a handheld power tool that has been set up to implement the method.

BACKGROUND

Rotary impact wrenches for tightening screw elements such as threaded nuts and screws, for instance, are known from the prior art—see EP 3 381 615 A1, for instance. A rotary impact wrench of this type encompasses, for instance, a structure in which an impact force in a direction of rotation is transmitted to a screw element by a rotary impact force of a hammer. The rotary impact wrench that has this structure comprises a motor, a hammer to be driven by the motor, an anvil which is struck by the hammer, and a tool. In the case of the rotary impact wrench, the motor which is built into a housing is driven, the hammer being driven by the motor, the anvil, in turn, being struck by the rotating hammer, and an impact force being delivered to the tool, in which connection two different operating states, namely "no-impact operation" and "impact operation", can be differentiated.

From EP 2 599 589 B1 a rotary impact wrench with a motor, with a hammer and with a rotational-speed capture unit is also known, the hammer being driven by the motor.

Knowledge of the operating state presently applying is required for the provision of intelligent tool functions.

An identification of said operating state is implemented in the prior art by, for instance, the monitoring of the operating quantities of the electric motor, such as speed and electric motor current. In this connection, the operating quantities are examined as to whether certain limiting values and/or threshold values are being reached. Corresponding evaluation methods operate with absolute threshold values and/or signal gradients.

In this connection it is a disadvantage that, in practice, a fixed limiting value and/or threshold value can be set perfectly only for one application. As soon as the application changes, the associated values of current or speed or the temporal progressions thereof also change, and a detection of an impact on the basis of the set limiting value and/or threshold value or the temporal progressions thereof no longer works.

It may happen, for instance, that an automatic shutdown based on the detection of the impact mode disconnects reliably within various speed ranges in individual applications where use is made of self-tapping screws, though in other applications where use is made of self-tapping screws no shutdown takes place.

In other methods for determining operating modes in rotary impact wrenches, additional sensors, such as acceleration sensors, are employed, in order to infer the operating mode presently applying from states of oscillation of the tool.

Disadvantages of this method are additional expenditure for the sensors and also losses in terms of the robustness of the handheld power tool, since the number of built-in components and electrical connections increases in comparison with handheld power tools without this sensor system.

In principle, the difficulties of the detection operating states also exist in other handheld power tools such as impact drilling machines, so the invention disclosure is not limited to rotary impact wrenches.

SUMMARY

The object of the disclosure consists in specifying a method for detecting operating states that is improved in comparison with the prior art and that at least partially eliminates the aforementioned disadvantages, or at least in specifying an alternative to the prior art. A further object consists in specifying a corresponding handheld power tool.

These objects are achieved by means of the respective subject-matter of the disclosure. Advantageous refinements of the disclosure are the subject-matter of the embodiments.

In accordance with the disclosure, a method is disclosed for detecting a first operating state of a handheld power tool, the handheld power tool exhibiting an electric motor. The method comprises the following steps:

S1 ascertaining a signal of an operating quantity of the electric motor;

S2 comparing the signal of the operating quantity with at least one state-typical model signal form, the state-typical model signal form (240) having been assigned to the first operating state;

S3 deciding whether the first operating state obtains, the decision depending at least partially on whether in step S2 the state-typical model signal form is identified in the signal of the operating quantity.

In this way, a simple and reliable monitoring and control for detecting the first operating state can take place, in the course of which, in principle, various operating quantities enter into consideration as operating quantities that are recorded via a suitable measured-value transducer. In this regard, it is particularly advantageous that no additional sensor is necessary, since diverse sensors—such as for speed monitoring, for instance, preferentially Hall sensors—have already been built into electric motors.

The approach for detecting the first operating state via operating quantities in the measured quantities within the tool—such as, for instance, the speed of the electric motor—proves to be particularly advantageous, since with this method the impact detection takes place particularly reliably and largely regardless of the general operating state of the tool or its application. In this case, sensor units-in particular, additional sensor units—for capturing the measured quantities within the tool—such as an acceleration-sensor unit, for instance—are substantially dispensed with, so that the method according to the disclosure serves substantially exclusively for detecting the first operating state.

Furthermore, the method according to the disclosure enables the detection of the first operating state regardless of at least one target speed of the electric motor, of at least one start-up characteristic of the electric motor and/or of at least one state of charge of a power supply—in particular, a storage battery—of the handheld power tool.

The method according to the disclosure enables the detection of the first operating state for applications in which a loose fastening element is being screwed into a fastening support, and also in which a firm fastening element—in particular, one that has been at least partially screwed in—is being screwed into a fastening support. The applications may encompass both hard and soft screwing cases, in which connection a typical application case may be, for instance, a self-tapping screw joint or a wooden screw joint.

In this connection, the "loose fastening element" is to be understood to be a fastening element that substantially has not been screwed into the fastening support and that is to be screwed into the fastening support. The "fixed fastening element" is to be interpreted as a fastening element that has been at least partially screwed into the fastening support or that has been substantially entirely screwed into the fastening support.

In another method step S0, preceding method steps S1 to S3, the at least one state-typical model signal form can be established, the state-typical model signal form having been assigned to the first operating state. In this connection, a limiting value and/or threshold value for an existing concordance or for an error that is present from the signal of the operating quantity to the state-typical model signal form may represent an adjustable quantity for applications for a successful impact detection.

In particular, the state-typical model signal form has been saved or stored within the device; alternatively and/or additionally, it has been made available to the handheld power tool, in particular made available from an external data device.

In the context of the present disclosure, "ascertaining" is to encompass, in particular, measuring or recording, in which connection "recording" is to be interpreted in the sense of measuring and storing; in addition, "ascertaining" is also to include a possible processing of a measured signal.

Furthermore, "deciding" is also to be understood as recognizing or detecting, in which connection an unambiguous assignment is to be obtained. "Identifying" is to be understood as detecting a partial concordance with a pattern, which can be made possible, for instance, by fitting a signal to the pattern, by a Fourier analysis or such like. The "partial concordance" is to be understood in such a manner that the fitting displays an error that is less than a predetermined threshold, in particular less than 30%, quite particularly less than 20%.

The signal of the operating quantity is to be interpreted here as a temporal succession of measured values. Alternatively and/or additionally, the signal of the operating quantity may also be a frequency spectrum. Alternatively and/or additionally, the signal of the operating quantity may also be reworked—such as, for instance, smoothed, filtered, fitted and such like.

In one embodiment, the state-typical model signal form is an oscillation curve around a mean value, in particular a substantially trigonometric oscillation curve. The state-typical model signal form preferentially represents an ideal impact operation of the hammer on the anvil of the rotary impact mechanism.

In another embodiment, the operating quantity is a speed of the electric motor or an operating quantity correlating with the speed. By virtue of the fixed gear ratio from electric motor to impact mechanism, a direct dependence of the motor speed on the impact frequency arises, for instance. Another conceivable operating quantity correlating with the speed is the motor current. A motor voltage, a Hall signal of the motor, a battery current or a battery voltage are also conceivable as operating quantity of the electric motor, in which connection an acceleration of the electric motor, an acceleration of a tool receptacle or a sonic signal of an impact mechanism of the handheld power tool is also conceivable as the operating quantity.

In another embodiment, the signal of the operating quantity is recorded in method step S1 as a temporal progression of measured values of the operating quantity, or recorded as measured values of the operating quantity as a quantity of the electric motor correlating with the temporal progression—for instance, an acceleration, a jolt, in particular of higher order, a power, an energy, an angle of rotation of the electric motor, an angle of rotation of the tool receptacle, or a frequency.

In the last-mentioned embodiment it can be guaranteed that a constant periodicity of the signal to be examined arises, regardless of the motor speed.

Alternatively, the signal of the operating quantity is recorded in method step S1 as a temporal progression of measured values of the operating quantity, in which connection, in a step S1*a* following method step S1, by reason of the fixed gear ratio of the transmission a transformation takes place of the temporal progression of the measured values of the operating quantity into a progression of the measured values of the operating quantity as a quantity of the electric motor correlating with the temporal progression. Consequently the same advantages arise once again as in the case of the direct recording of the signal of the operating quantity over time.

In another embodiment, the signal of the operating quantity is stored as a sequence of measured values in a memory, preferentially a ring memory, in particular of the handheld power tool.

In a preferred configuration, a segmentation of the measured values is implemented in method step S1 in such a manner that the signal of the operating quantity always comprises a predetermined number of measured values.

In a particularly advantageous configuration, the signal of the operating quantity is compared in method step S2 by means of one of the comparison methods encompassing at least one frequency-based comparison method and/or a comparative comparison method, the comparison method comparing the signal of the operating quantity with the state-typical model signal form as to whether at least one predetermined threshold value is satisfied. The predetermined threshold value may have been predetermined at the factory or may be capable of being set by a user.

In one embodiment, the frequency-based comparison method encompasses at least bandpass filtering and/or frequency analysis, the predetermined threshold value amounting to at least 85%, in particular 90%, quite particularly 95%, of a predetermined limiting value.

In bandpass filtering, the recorded signal of the operating quantity is, for instance, filtered through a bandpass filter, the pass-range of which coincides with the state-specific model signal form. A corresponding amplitude in the resulting signal is to be expected in the first operating state, particularly in the impact mode. The predetermined threshold value of the bandpass filtering may therefore be at least 85%, in particular 90%, quite particularly 95%, of the corresponding amplitude in the first operating mode, particularly in the impact mode. The predetermined limiting value may be the corresponding amplitude in the resulting signal of an ideal first operating state, in particular of an ideal impact mode.

By virtue of the known frequency-based comparison method of frequency analysis, the previously established state-typical model signal form—for instance, a frequency spectrum of the first operating state, in particular of an impact mode—can be sought in the recorded signals of the operating quantity. In the recorded signals of the operating quantity, a corresponding amplitude of the first operating state, in particular of the impact mode, is to be expected. The predetermined threshold value of the frequency analysis may be at least 85%, in particular 90%, quite particularly 95%, of the corresponding amplitude in the first operating mode, particularly in the impact mode.

The predetermined limiting value may be the corresponding amplitude in the recorded signals of an ideal first operating state, in particular of an ideal impact mode. An appropriate segmentation of the recorded signal of the operating quantity may be necessary.

In method step S3, the decision as to whether the first operating state was identified in the signal of the operating quantity can be made at least partially by means of the frequency-based comparison method—in particular, the bandpass filtering and/or the frequency analysis.

In one embodiment, the comparative comparison method encompasses at least parameter estimation and/or cross-correlation, the predetermined threshold value amounting to at least 50% of a concordance of the signal of the operating quantity with the state-typical model signal form.

The measured signal of the operating quantity can be compared with the state-typical model signal form by means of the comparative comparison method. The measured signal of the operating quantity is ascertained in such a manner that it has substantially the same finite signal length as that of the state-typical model signal form. The comparison of the state-typical model signal form with the measured signal of the operating quantity can be output as a signal—in particular, a discrete or continuous signal—of a finite length. Depending on a degree of the concordance or of a deviation of the comparison, a result can be output as to whether the first operating state—in particular, the impact mode—is present. If the measured signal of the operating quantity concords with the state-typical model signal form in a proportion amounting to at least 50%, the first operating state, in particular the impact mode, may obtain. In addition, it is conceivable that the comparative method can output a degree of a deviation from one another as the result of the comparison by means of the comparison of the measured signal of the operating quantity with the state-typical model signal form. In this connection, the deviation of at least 50% from one another may be as a criterion for existence of the first operating state, in particular the impact mode.

In the case of a parameter estimation, a comparison can be made in straightforward manner between the previously established state-typical model signal form and the signal of the operating quantity. For this purpose, estimated parameters of the state-typical model signal form can be identified, in order to assimilate the state-typical model signal form to the measured signal of the operating quantities. By means of a comparison between the estimated parameters of the previously established state-typical model signal form and the signal of the operating quantity, a result relating to the existence of the first operating state, in particular the impact mode, can be ascertained. Subsequently an assessment can be made of the result of the comparison as to whether the predetermined threshold value was reached. This assessment may be either a determination of the quality of the estimated parameters or the deviation between the established state-typical model signal form and the captured signal of the operating quantity.

In another embodiment, method step S2 includes a step S2*a* of a determination of the quality of the identification of the state-typical model signal form in the signal of the operating quantity, the decision in method step S3 as to whether the first operating state obtains being made at least partially on the basis of the quality determination. A goodness of fit of the estimated parameters can be ascertained as a measure of the quality determination.

In method step S3, the decision as to whether the first operating state was identified in the signal of the operating quantity can be made at least partially by means of the quality determination, in particular by means of the measure of the quality.

In addition to, or as an alternative to, the quality determination, in method step S2*a* a determination of the deviation of the identification of the state-typical model signal form and the signal of the operating quantity may comprise. The deviation of the estimated parameters of the state-typical model signal form from the measured signal of the operating quantity may amount to, for instance, 70%, in particular 60%, quite particularly 50%. In method step S3, the decision as to whether the first operating state obtains is made, at least partially, on the basis of the determination of the deviation. The decision relating to the existence of the first operating state can be made at the predetermined threshold value of at least 50% concordance of the measured signal of the operating quantity and of the state-typical model signal form.

In the case of a cross-correlation, a comparison can be made between the previously established state-typical model signal form and the measured signal of the operating quantity. In the case of cross-correlation, the previously established state-typical model signal form can be correlated with the measured signal of the operating quantity. In the case of a correlation of the state-typical model signal form with the measured signal of the operating quantity, a degree of the concordance of the two signals can be ascertained. The degree of concordance may amount to, for instance, 40%, in particular 50%, quite particularly 60%.

In method step S3 of the method according to the disclosure, the decision as to whether the first operating state obtains can be made at least partially on the basis of the cross-correlation of the state-typical model signal form with the measured signal of the operating quantity. The decision can be made at least partially on the basis of the predetermined threshold value of at least 50% concordance of the measured signal of the operating quantity and the state-typical model signal form.

In one method step, the first operating state is identified on the basis of less than ten impacts of an impact mechanism of the handheld power tool, in particular less than ten impact-oscillation periods of the electric motor, preferably less than six impacts of an impact mechanism of the handheld power tool, in particular less than six impact-oscillation periods of the electric motor, quite preferably less than four impacts of an impact mechanism, in particular less than four impact-oscillation periods of the electric motor. In this connection, an axial, radial, tangential and/or circumferential impact of a striker of an impact mechanism, in particular a hammer, on a body of an impact mechanism, in particular an anvil, is to be understood as an impact of the impact mechanism. The impact-oscillation period of the electric motor is correlated with the operating quantity of the electric motor. An impact-oscillation period of the electric motor can be ascertained on the basis of operating-quantity fluctuations in the signal of the operating quantity during the first operating state.

The identification of the impacts of the impact mechanism of the handheld power tool, in particular the impact-oscillation periods of the electric motor, can be obtained, for instance, by use being made of a fast-fitting algorithm, by means of which an evaluation of the impact detection can be made possible within less than 100 ms, in particular less than 60 ms, quite particularly less than 40 ms. In this connection, the inventive method enables the detection of the first operating state substantially for all the aforementioned applications, and of an operation for screwing loose as well as firm fastening elements into the fastening support.

The handheld power tool is advantageously an impact wrench, in particular a rotary impact wrench, and the first operating state is advantageously an impact mode, in particular a rotary impact mode.

By virtue of the present disclosure, it is possible for costly methods of signal processing—such as, for example, filters, signal loopbacks, system models (static as well as adaptive) and signal-tracking processes—to be very largely dispensed with.

In addition, these methods permit an even faster identification of the impact mode or of the progress of work, by which an even faster reaction of the tool can be brought about. This applies, in particular, to the number of prior impacts after deploying the impact mechanism up until the identification, and also in special operating situations such as, for example, the start-up phase of the drive motor. Also, no restrictions of the functionality of the tool—such as, for instance, a lowering of the maximum drive speed—have to be imposed.

In principle, no additional sensor system (for example, acceleration sensor) is necessary, but these evaluation methods can also be applied to signals of other sensor systems. Moreover, in other motor concepts, which, for instance, manage without speed capture, this method can also find application with other signals.

A further subject-matter of the disclosure is constituted by a handheld power tool exhibiting an electric motor, a pick-up for a measured value of an operating quantity of the electric motor, and a motor controller, the handheld power tool advantageously being an impact wrench, in particular a rotary impact wrench, and the first operating state advantageously being an impact mode, in particular a rotary impact mode. In this case, the electric motor sets an input spindle in rotation, an output spindle being connected to a tool receptacle. An anvil is connected to the output spindle in torsion-resistant manner, and a hammer is connected to the input spindle in such a manner that as a consequence of the rotary motion of the input spindle it executes an intermittent motion in the axial direction of the input spindle and also an intermittent rotatory motion about the input spindle, in the course of which the hammer strikes the anvil intermittently in this way and so delivers an impact impulse and a rotary impulse to the anvil and consequently to the output spindle. A first sensor transmits a first signal-for instance, for ascertaining a rotation angle of the motor-to the control unit. Furthermore, a second sensor can transmits a second signal for ascertaining a motor speed to the control unit. The control unit has advantageously been designed to implement a method as disclosed herein.

In another embodiment, the handheld power tool is a battery-operated handheld power tool, in particular a battery-operated rotary impact wrench. In this way, a flexible and mains-independent use of the handheld power tool is guaranteed.

In a preferred embodiment, the handheld power tool is a cordless screwdriver, a drilling machine, an impact drilling machine or a drill hammer, in which case a drill, a drill bit or various bit attachments may be used as tool. The handheld power tool according to the disclosure takes the form, in particular, of an impact screwing tool, in which case a higher peak torque for screwing in or unscrewing a screw or a screw nut is generated by the impulsive release of the energy of the motor. The "transmission of electrical energy" in this connection is to be understood to mean, in particular, that the handheld power tool routes energy to the body via a storage battery and/or via a power-cable connection.

In addition, depending on the chosen embodiment, the screwing tool may have been designed to be flexible in the direction of rotation. In this way, the proposed method can be used both for screwing in and for unscrewing a screw or a screw nut.

Further features, possible applications and advantages of the disclosure arise out of the following description of the exemplary embodiment of the disclosure that is represented in the drawing. In this regard, it is to be noted that the features described or represented in the figures, by themselves or in any combination, the subject-matter of the disclosure, regardless of their subordinating relationship, and also regardless of their formulation or presentation in the description or in the drawing, has only a descriptive character and is not intended to restrict the disclosure in any form.

BRIEF DESCRIPTION OF THE DRAWINGS.

The disclosure will be elucidated in more detail in the following with reference to the figures. Shown are:

FIG. 2(*b*) a schematic representation of a signal of an operating quantity of a handheld power tool in the case of a firm fastening element;

DETAILED DESCRIPTION

Figure 1:
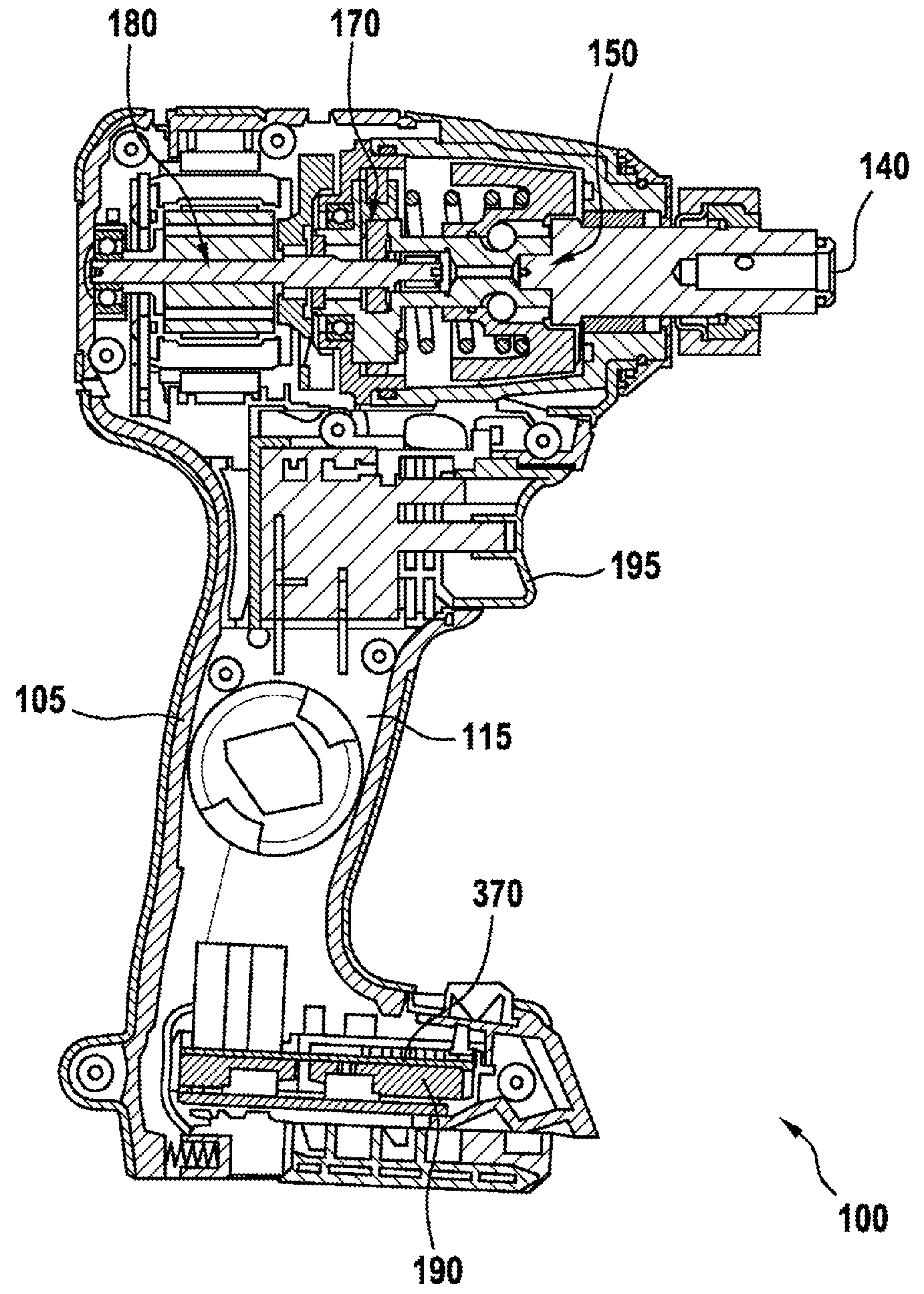
FIG. 1 a schematic representation of an electric handheld power tool.

FIG. 1 shows a handheld power tool 100 according to the disclosure, which exhibits a housing 105 with a handle 115. According to the embodiment represented, the handheld power tool 100 is capable of being connected mechanically and electrically to a battery pack 190 for its mains-independent power supply. In FIG. 1, the handheld power tool 100 takes the form, in exemplary manner, of a cordless rotary impact wrench. However, attention is drawn to the fact that the present disclosure is not limited to cordless impact wrenches but may, in principle, find application in handheld power tools 100 in which the detection of operating states is necessary, such as in impact drilling machines, for instance.

An electric motor 180, supplied with power by the battery pack 190, and a transmission 170 are arranged in the housing 105. The electric motor 180 is connected to an input spindle via the transmission 170. Furthermore, within the housing 105 in the region of the battery pack 190 a control unit 370 is arranged which for the purpose of controlling and/or regulating the electric motor 180 and the transmission 170 acts on these, for instance by means of a set motor speed n, a selected angular momentum, a desired transmission gear x or such like.

The electric motor 180 is capable of being actuated—that is to say, capable of being switched on and off—via a manual switch 195, for instance, and may be any type of motor, for instance an electronically commutated motor or a DC motor. In principle, the electric motor 180 is capable of being controlled or regulated electronically in such a manner that both a reversing mode and specifications with regard to the desired motor speed n and the desired angular momentum are capable of being realized. The mode of operation and the structure of a suitable electric motor are sufficiently well-known from the prior art, so a detailed description will be dispensed with here for the sake of conciseness of the description.

A tool receptacle 140 is rotatably mounted in the housing 105 via an input spindle and an output spindle. The tool receptacle 140 serves for receiving a tool and may have been directly molded onto the output spindle or connected thereto in the form of an attachment.

The control unit 370 is connected to a power-source and is designed in such a manner that it is able to drive the electric motor 180 in electronically controllable manner by means of various current signals. The various current signals provide for differing angular momenta of the electric motor 180, the current signals being passed to the electric motor 180 via a control line. The power-source may take the form, for instance, of a battery or—as in the exemplary embodiment represented—a battery pack 190 or a mains connection.

Furthermore, operating elements not represented in detail may have been provided, in order to set various operating modes and/or the direction of rotation of the electric motor 180.

Figure 2A:
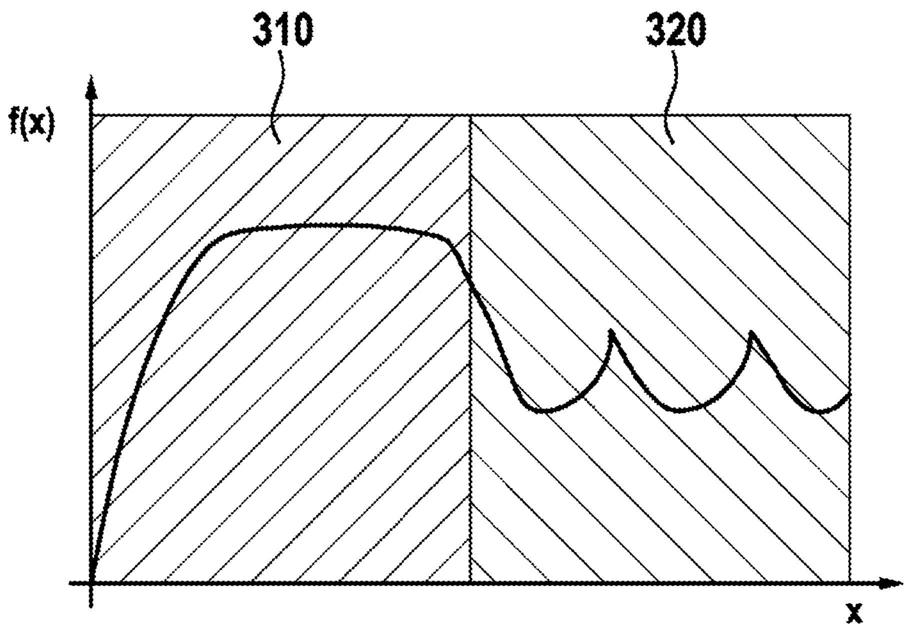
FIG. 2(*a*) a schematic representation of a signal of an operating quantity of a handheld power tool in the case of a loose fastening element.
Figure 2B:
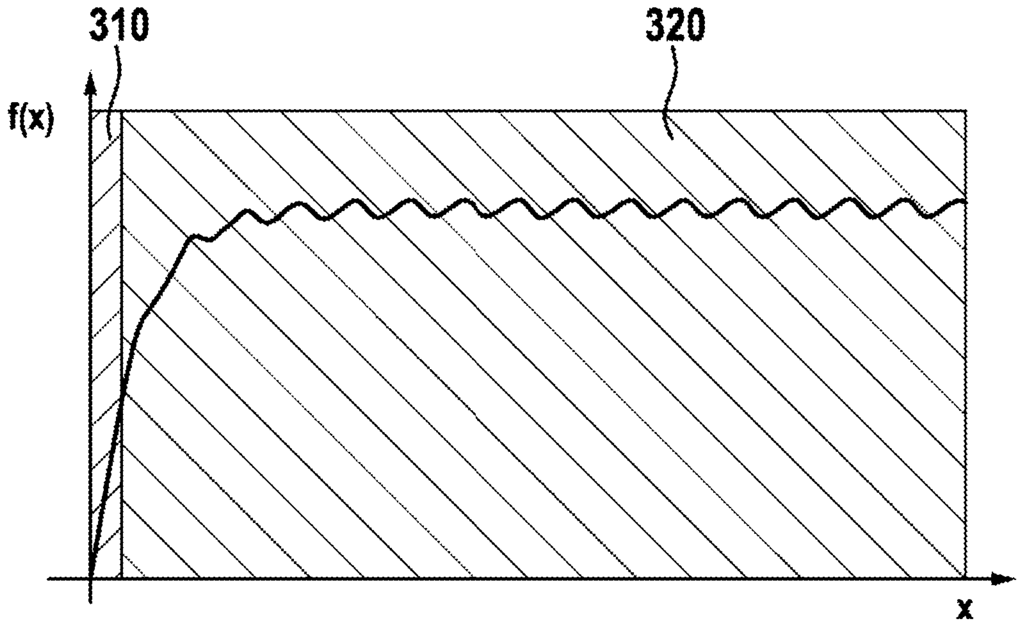

In FIG. 2 an exemplary signal is represented of an operating quantity 200 of an electric motor 180 of a rotary impact wrench, such as occurs in this or similar form in the course of the use of a rotary impact wrench as intended. While the following statements relate to a rotary impact wrench, within the scope of the disclosure they also apply analogously to other handheld power tools 100 such as impact drilling machines, for instance.

In the present example shown in FIG. 2, the time has been plotted as reference quantity on the abscissa x. In an alternative embodiment, however, a quantity correlated with time is plotted as reference quantity, such as, for instance, the angle of rotation of the tool receptacle 140 or the angle of rotation of the electric motor 180. In the figure, the motor speed n applying at any point in time has been plotted on the ordinate f(x). Instead of the motor speed, another operating quantity correlating with the motor speed may also be chosen. In alternative embodiments of the disclosure, f(x) represents a signal of the motor current, for instance.

Figure 4:
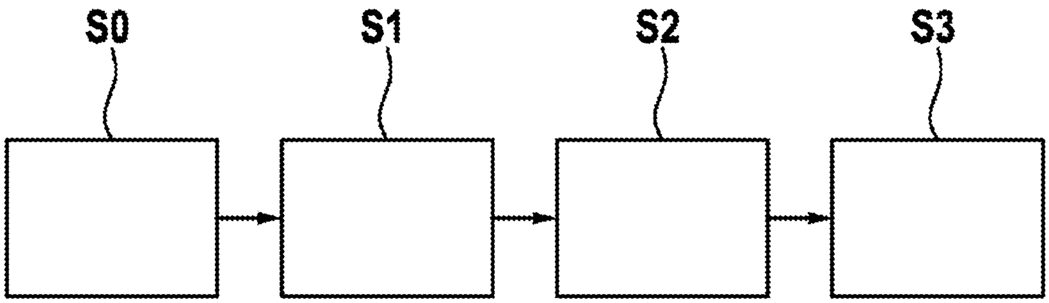
FIG. 4 a flowchart of a method according to the disclosure.

The motor speed and motor current are operating quantities which, in the case of handheld power tools 100, are ordinarily captured by a control unit 370 without additional effort. The ascertaining of the signal of an operating quantity 200 of the electric motor 180 has been labeled as method step S1 in FIG. 4, which shows a schematic flowchart of a method according to the disclosure. In preferred embodiments of the disclosure, a user of the handheld power tool 100 can select the operating quantity on the basis of which the inventive method is to be carried out.

In FIG. 2(*a*) a case is shown of application of a loose fastening element, for instance a screw, into a mounting support, for instance a wooden board. It will be discerned in FIG. 2(*a*) that the signal encompasses a first region 310, which is characterized by a monotonic increase of the motor speed, and also by a region of comparatively constant motor speed, which may also be designated as a plateau. The point of intersection between the abscissa x and the ordinate f(x) in FIG. 2(*a*) corresponds, in the course of the screwing operation, to the start-up of the rotary impact wrench.

In the first region 310, the rotary impact wrench is operating in the operating state of screwing without impact.

In a second region 320, the rotary impact wrench is operating in a rotary impact mode. The rotary impact mode is characterized by an oscillating progression of the signal of the operating quantity 200; the shape of the oscillation may be, for instance, trigonometric or oscillating in some other way. In the present case, the oscillation has a progression that may be designated as a modified trigonometric function, the upper half-wave of the oscillation having a pointy-hat or tooth-like shape. This characteristic shape of the signal of the operating quantity 200 in the impact-screwing mode arises by virtue of the raising and releasing of the impact-mechanism striker and of the system chain—amongst other things, of the transmission 170—located between the impact mechanism and the electric motor 180.

The qualitative signal form of the impact mode is accordingly known in principle by reason of the inherent properties of the rotary impact wrench. In the method according to the disclosure shown in FIG. 4, proceeding from this perception at least one state-typical model signal form 240 is established in a step SO, the state-typical model signal form 240 having been assigned to the first operating state—that is to say, in the example shown in FIG. 2(*a*), to the impact-screwing mode in the second region 320. In other words, the state-typical model signal form 240 includes features typical of the first operating state, such as the presence of an oscillation curve, oscillation frequencies or amplitudes or individual signal sequences in continuous, quasi-continuous or discrete form.

In other applications, the first operating state to be detected may be characterized by signal forms other than oscillations, for instance by discontinuities or rates of growth of the function f(x). In such cases, the state-typical model signal form is characterized by precisely these parameters instead of by oscillations.

In FIG. 2(*b*) a case is shown of application of a firm fastening element, for instance a screw, into a fastening support, for instance a wooden board. In this connection, "firm" means that the fastening element has been at least partially screwed tight into the fastening support, and an interrupted screwing operation is to be continued. The reference symbols and designations of the first and second regions 310, 320 are as in FIG. 2(*a*). The difference of the application in FIG. 2(*b*) from FIG. 2(*a*) consists in the fact that, after a brief start-up phase with the monotonically increasing speed, the rotary impact mode begins already during the monotonically increasing speed. In FIG. 2(*b*) it can be discerned that substantially no plateau with the comparatively constant speed prevails.

In a preferred configuration of the inventive method, the state-typical model signal form 240 can be established in method step S0. The state-typical model signal form 240 may have been saved, calculated or stored within the device.

In an alternative embodiment, the state-typical model signal form can, alternatively and/or additionally, be made available to the handheld power tool 100, for instance from an external data device.

In a method step S2 of the method according to the disclosure, the signal of the operating quantity of the electric motor 180 is compared with the state-typical model signal form 240. In the context of the present disclosure, the "comparing" feature is to be interpreted broadly and in the sense of a signal analysis, so that a result of the comparison may be, in particular, also a partial or slight concordance of the signal of the operating quantity 200 of the electric motor 180 with the state-typical model signal form 240, in which connection the degree of concordance of the two signals can be ascertained by various methods which will be mentioned at a later point.

In a method step S3 of the method according to the disclosure, the decision as to whether the first operating state obtains is made, at least partially, on the basis of the result of the comparison. In this connection, the degree of concordance is a parameter that is capable of being set at the factory or by the user for the purpose of setting a sensitivity of the detection of the first operating state.

In practical applications there may be provision that method steps S1, S2 and S3 are carried out repetitively during the operation of a handheld power tool 100, in order to monitor the operation for the presence of the first operating state. For this purpose, a segmentation of the ascertained signal of the operating quantity 200 can take place in method step S1, so that method steps S2 and S3 are implemented in respect of signal segments, preferentially always of the same fixed length.

For this purpose, the signal of the operating quantity 200 can be stored as a sequence of measured values in a memory, preferentially a ring memory. In this embodiment, the handheld power tool 100 includes the memory, preferentially the ring memory.

As already mentioned in connection with FIG. 2, in preferred embodiments of the disclosure the signal of the operating quantity 200 is ascertained in method step S1 as a temporal progression of measured values of the operating quantity or as measured values of the operating quantity as a quantity of the electric motor 180 correlating with the temporal progression. In this case, the measured values may be discrete, quasi-continuous or continuous.

One embodiment provides that the signal of the operating quantity 200 is recorded in method step S1 as a temporal progression of measured values of the operating quantity and, in a method step S1*a* following method step S1, a transformation takes place of the temporal progression of the measured values of the operating quantity into a progression of the measured values of the operating quantity as a quantity of the electric motor 180 correlating with the temporal progression, such as, for instance, the angle of rotation of the tool receptacle 140 or the angle of rotation of the motor.

Figure 3A:
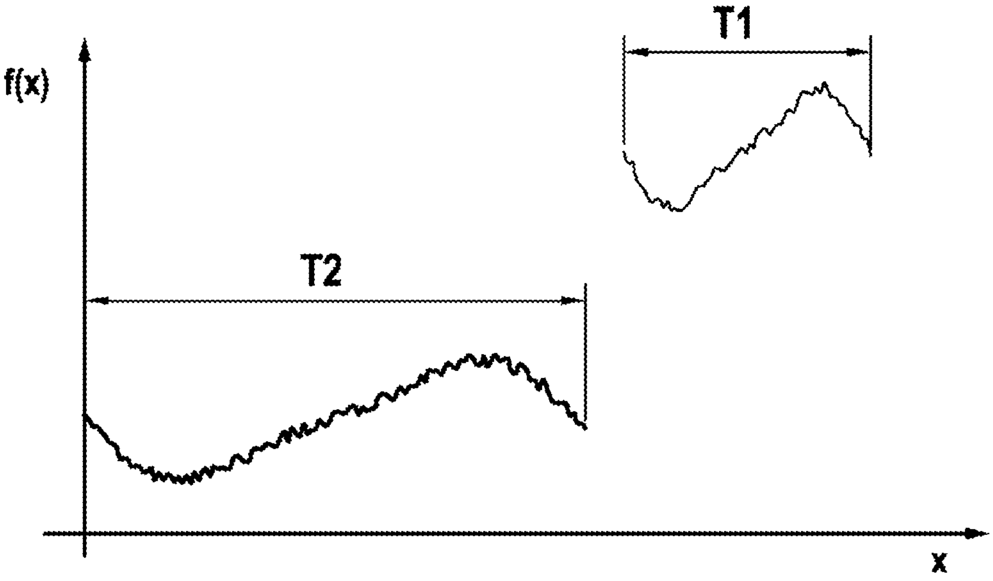
FIG. 3 a schematic representation of two different recordings of the signal of the operating quantity.
Figure 3B:
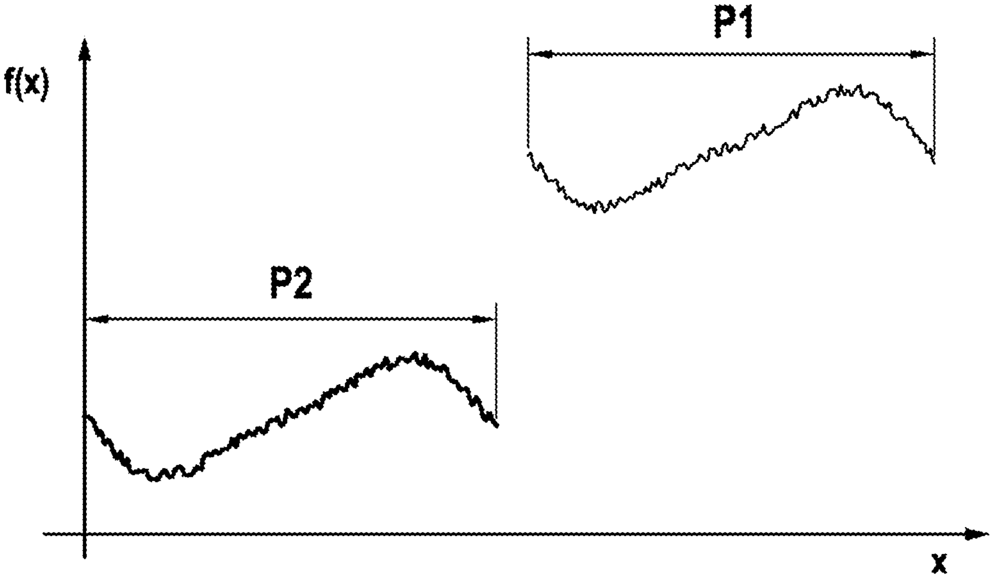

The advantages of this embodiment will be described in the following with reference to FIG. 3. In a manner similar to FIG. 2, FIG. 3*a* shows signals f(x) of an operating quantity 200 over an abscissa x, in this case over the time t. As in FIG. 2, the operating quantity may be a motor speed or a parameter correlating with the motor speed.

The illustration includes two signal progressions of the operating quantity 200 in the first operating mode—that is to say, in the case of a rotary impact wrench, in the rotary impact-screwing mode. In both cases, the signal includes a wavelength of an oscillation curve assumed in idealized manner to be sinusoidal, the signal of shorter wavelength, T1, exhibiting progression with higher impact frequency, and the signal of longer wavelength, T2, exhibiting a progression with lower impact frequency.

Both signals can be generated with the same handheld power tool 100 at various motor speeds and are, amongst other things, dependent on the speed of rotation that the user requests from the handheld power tool 100 via the operating switch.

If, for instance, the "wavelength" parameter is now to be drawn upon for the purpose of defining the state-typical model signal form 240, in the present case at least two different wavelengths T1 and T2 would accordingly have to have been saved as possible parts of the state-typical model signal form in order that the comparison of the signal of the operating quantity 200 with the state-typical model signal form 240 leads to the result "concordance" in both cases. Since the motor speed may change over time generally and to a great extent, this has the consequence that the wavelength being sought also varies, and as a result the methods for detecting this impact frequency would have to be adapted accordingly.

Given a large number of possible wavelengths, the cost of the process and of the programming would increase correspondingly quickly.

In the preferred embodiment, the time values on the abscissa are therefore transformed into values correlating with the time values, such as, for instance, acceleration values, higher-order jolt values, power values, energy values, frequency values, values of angle of rotation of the tool receptacle 140, or values of angle of rotation of the electric motor 180. This is possible, because by virtue of the fixed gear ratio of the electric motor 180 relative to the impact mechanism and to the tool receptacle 140 a direct, known dependence of the motor speed on the impact frequency arises. By virtue of this normalization, an oscillation signal of constant periodicity is obtained that is independent of the motor speed, this being represented in FIG. 3*b* by the two signals appertaining to T1 and T2 from the transformation of the, both signals now having the same wavelength P1=P2.

Correspondingly, in this embodiment of the disclosure the state-specific model signal form 240 can be established to be valid for all speeds by a single parameter of the wavelength via the quantity correlating with time, such as, for instance, the angle of rotation of the tool receptacle 140 or the angle of rotation of the motor.

In a preferred embodiment, the comparison of the signal of the operating quantity 200 takes place in method step S2 with a comparison method, the comparison method encompassing at least one frequency-based comparison method and/or a comparative comparison method. The comparison method compares the signal of the operating quantity 200 with the state-typical model signal form 240 as to whether at least one predetermined threshold value is satisfied. The frequency-based comparison method encompasses at least bandpass filtering and/or frequency analysis. The comparative comparison method encompasses at least parameter estimation and/or cross-correlation. The frequency-based comparison method and the comparative comparison method will be described in more detail in the following.

In embodiments with bandpass filtering, the input signal, transformed to a quantity correlating with time, where appropriate as described, is filtered through a bandpass filter, the pass-range of which represents the predetermined threshold value. The pass-range arises out of the state-typical model signal form 240. It is also conceivable that the pass-range coincides with a frequency established in connection with the state-typical model signal form 240. In the case where amplitudes of this frequency exceed a previously established limiting value, as is the case in the first operating state, the comparison in method step S2 then leads to the result that the signal of the operating quantity 200 resembles the state-typical model signal form 240, and that the first operating state is consequently being carried out. The establishment of a limiting value of amplitude may in this embodiment be interpreted as a method step S2*a*, following method step S2, of a determination of the quality of the concordance of the state-typical model signal form 240 with the signal of the operating quantity 200, on the basis of which it is decided in method step S3 whether or not the first operating state obtains.

In embodiments that use frequency analysis as a frequency-based comparison method, the signal of the operating quantity 200 is transformed from a time-domain into the frequency-domain with appropriate weighting of the frequencies on the basis of the frequency analysis, for instance on the basis of fast Fourier transformation (FFT), in which connection the term "time-domain" according to the above statements is to be understood at this point both as "progression of the operating quantity over time" and as "progression of the operating quantity as a quantity correlating with time".

Frequency analysis in this manifestation is sufficiently well-known as a mathematical tool of signal analysis from many fields of technology and is used, amongst other things, to approximate measured signals as series expansions of weighted periodic harmonic functions of varying wavelength.

In this case, the weighting factors indicate whether and to what extent the corresponding harmonic functions of a certain wavelength are present in the signal being examined.

In relation to the method according to the disclosure, it can accordingly be established with the aid of frequency analysis whether and with what amplitude the frequency assigned to the state-typical model signal form 240 is present in the signal of the operating quantity 200. As mentioned in connection with bandpass filtering, a limiting value of the amplitude can be established which is a measure of the degree of the concordance of the signal of the operating quantity 200 with the state-specific model signal form 240. If the amplitude of the frequency assigned to the state-specific model signal form 240 in the signal of the operating quantity 200 exceeds this limiting value, in method step S3 it is established that the first operating state obtains.

In embodiments in which the comparative comparison method is used, the signal of the operating quantity 200 is compared with the state-typical model signal form 240, in order to find out whether the measured signal of the operating quantity 200 exhibits at least a concordance of 50% with the state-typical model signal form 240 and hence the predetermined threshold is reached. It is also conceivable that the signal of the operating quantity 200 is compared with the state-typical model signal form 240, in order to ascertain a deviation of the two signals from one another.

In embodiments of the method according to the disclosure in which parameter estimation is used as comparative comparison method, the measured signal of the operating quantities 200 is compared with the state-typical model signal form 240, in the course of which estimated parameters are identified for the state-typical model signal form 240. With the aid of the estimated parameters, a degree of the concordance of the measured signal of the operating quantities 200 with the state-typical model signal form 240 can be ascertained as to whether the first operating state obtains. The parameter estimation in this connection is based on the balancing calculation which is a mathematical optimization method known to a person skilled in the art. With the aid of the estimated parameters, the mathematical optimization method enables the state-typical model signal form 240 to be assimilated to a series of measured data of the signal of the operating quantity 200. Depending a degree of the concordance of the estimated parameters of the state-typical model signal form 240 with the measured signal of the operating quantity 200, the decision can be made as to whether the first operating state obtains.

With the aid of the balancing calculation of the comparative method of parameter estimation, a measure of a deviation of the estimated parameters of the state-typical model signal form 240 from the measured signal of the operating quantity 200 can also be ascertained.

In order to decide whether a sufficient concordance or a sufficiently small deviation of the state-typical model signal form 240 with the estimated parameters from the measured signal of the operating quantity 200 obtains, a determination of the deviation is implemented in method step S2*a* following method step S2. If the deviation of the state-typical model signal form 240 from the measured signal of the operating quantity of 70% is ascertained, the decision can be made as to whether the first operating state was identified in the signal of the operating quantity and whether the first operating state obtains.

In order to decide whether a sufficient concordance of the state-specific model signal form 240 with the signal of the operating quantity 200 obtains, in another embodiment, in a method step S2*a* following method step S2, a determination of quality for the estimated parameters is implemented. In the course of the quality determination, values for a quality between 0 and 1 are ascertained, in which connection it holds that a higher value represents a higher concordance between the state-typical model signal form 240 with the signal of the operating quantity 200. In the preferred embodiment, the decision as to whether the first operating state obtains is made in method step S3 at least partially on the basis of the condition that the value of the quality within a range of 50%.

In one embodiment of the inventive method, the method of cross-correlation is used as comparative comparison method in method step S2. Like the mathematical methods described in the foregoing, the method of cross-correlation is also known as such to a person skilled in the art. In the case of the method of cross-correlation, the state-typical model signal form 240 is correlated with the measured signal of the operating quantity 200.

In comparison with the method of parameter estimation presented above, the result of the cross-correlation is again a signal sequence with an added signal length consisting of a length of the signal of the operating quantity 200 and of the state-typical model signal form 240, which represents the similarity of the time-shifted input signals. The maximum of this output sequence represents the point in time of the highest concordance of the two signals—that is to say, of the signal of the operating quantity 200 and of the state-typical model signal form 240—and is therefore also a measure of the correlation itself, which in this embodiment is used in method step S3 as a decision criterion for the existence of the first operating state. In the implementation in the method according to the disclosure, a significant difference from the parameter estimation is that any state-typical model signal forms can be used for the cross-correlation, whereas in the case of parameter estimation the state-typical model signal form 240 must be able to be represented by parameterizable mathematical functions.

Figure 5A:
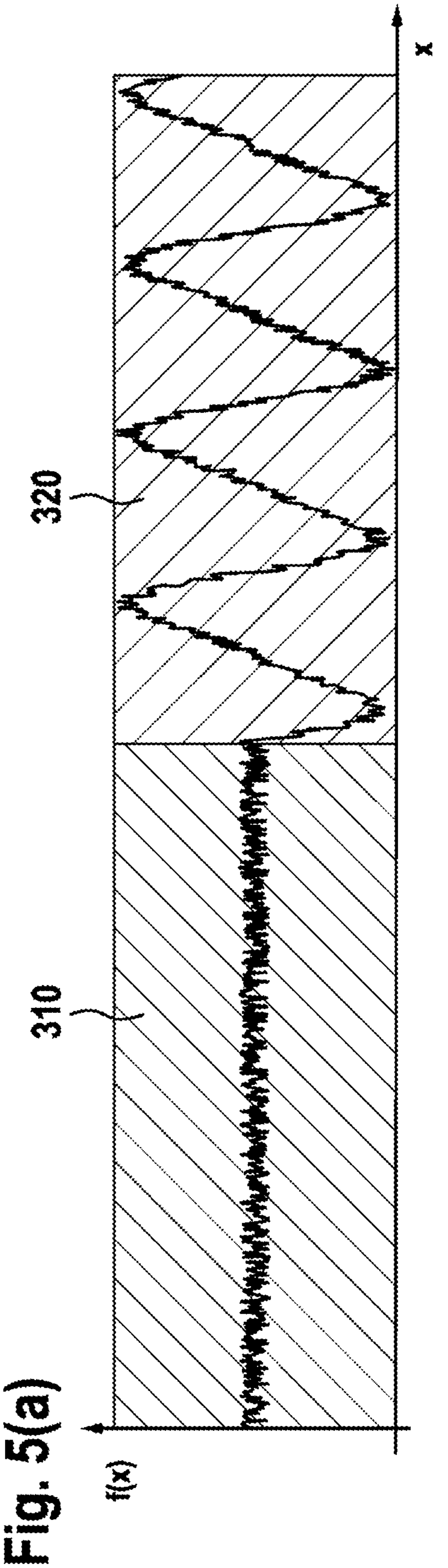
FIG. 5 a joint representation of a signal of an operating quantity and of a state-typical model signal for the bandpass filtering.
Figure 5B:
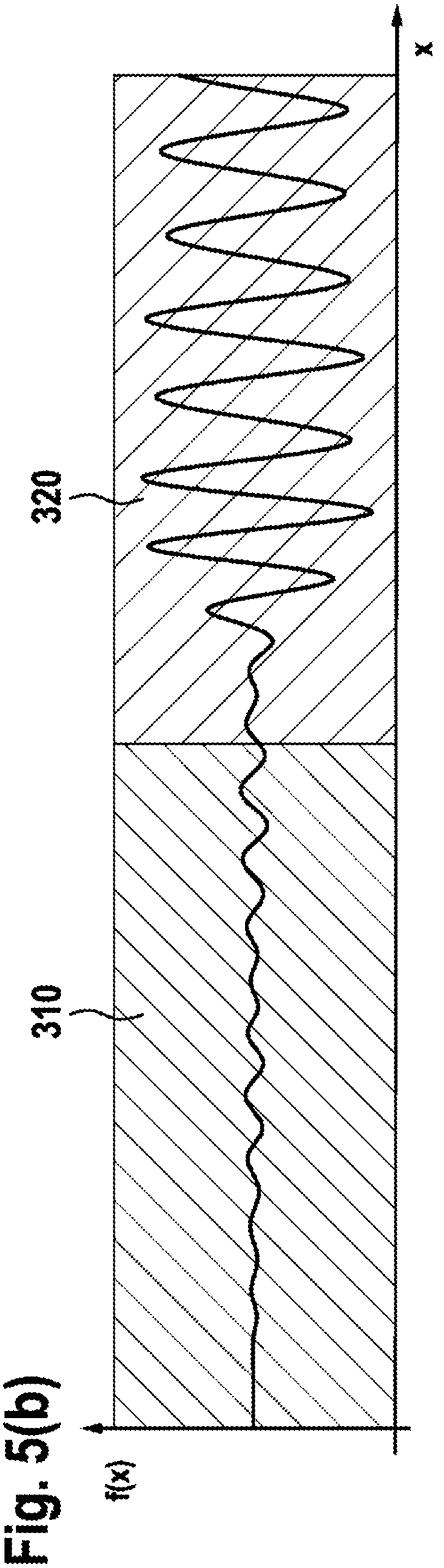
Figure 6A:
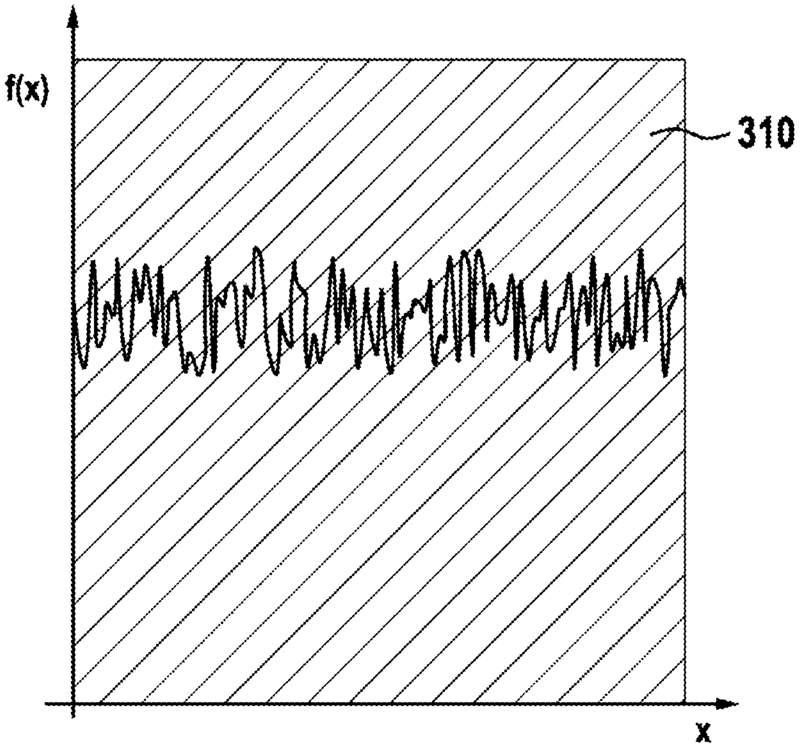
FIG. 6 a joint representation of a signal of an operating quantity and of a state-typical model signal for the frequency analysis.
Figure 6B:
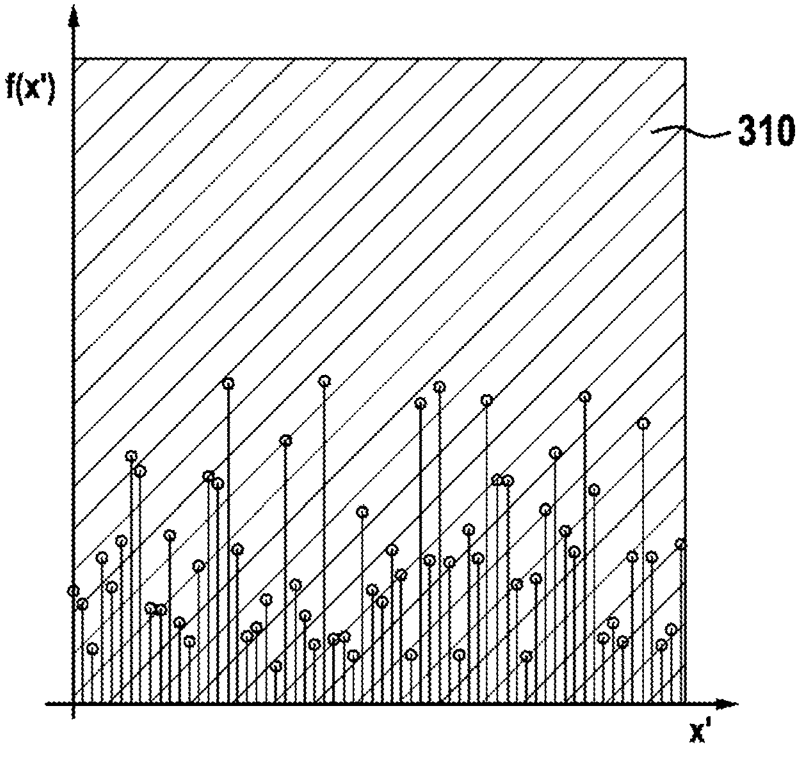
Figure 6C:
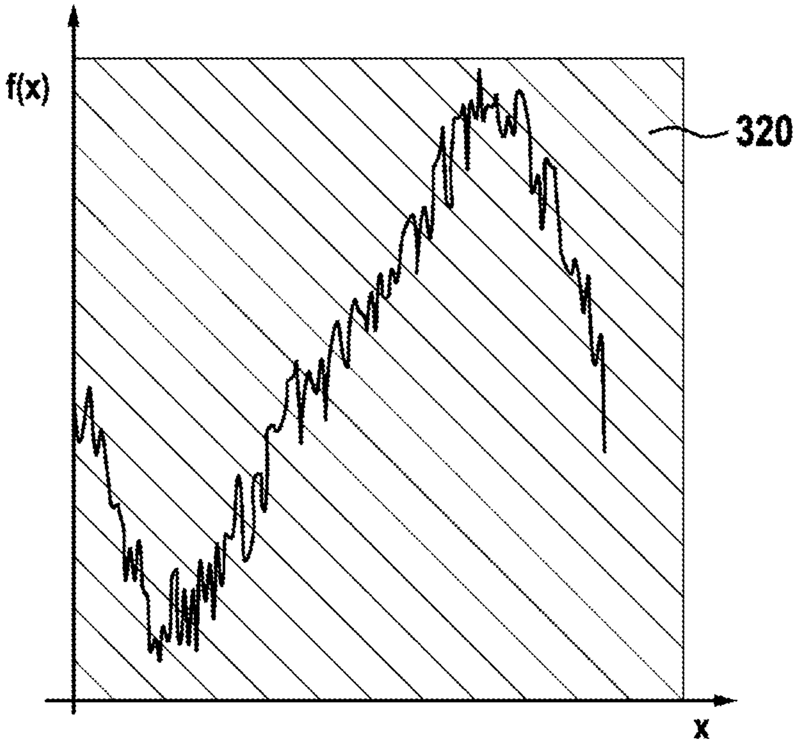
Figure 6D:
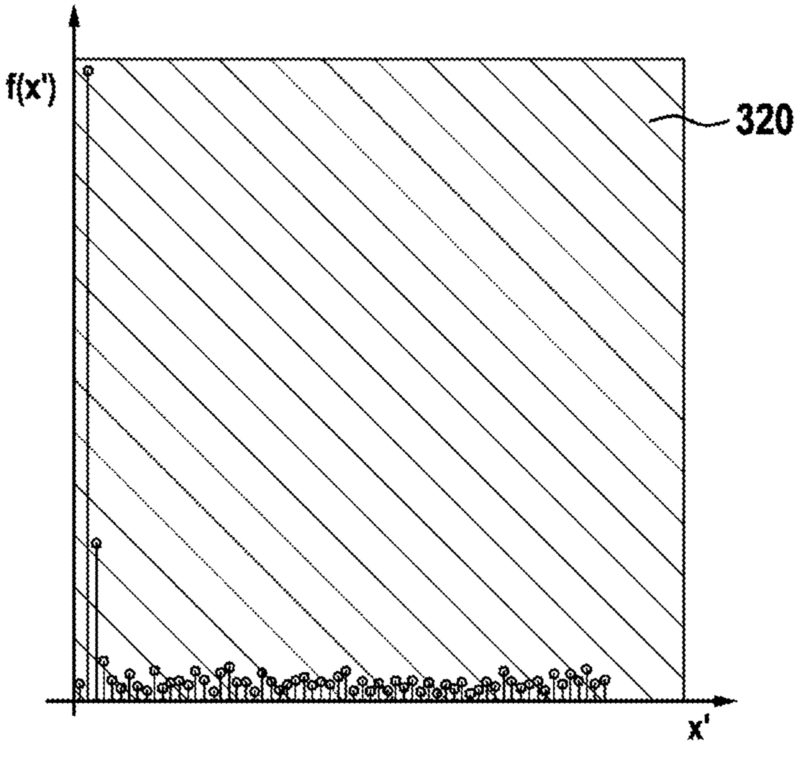

FIG. 5 shows the measured signal of the operating quantity 200 for the case where bandpass filtering is used as the frequency-based comparison method. In this connection, the time, or a quantity correlating with time, is plotted as the abscissa x. FIG. 5*a* shows the measured signal of the operating quantity, an input signal of the bandpass filtering, the handheld power tool 100 being operated in the screwing mode in the first region 310. In the second region 320, the handheld power tool 100 is being operated in the rotary impact mode. FIG. 5*b* represents the output signal after the bandpass filter has filtered the input signal.

FIG. 6 represents the measured signal of the operating quantity 200 for the case where frequency analysis is used as the frequency-based comparison method. In FIGS. 6*a* and 6*b*, the first region 310 is shown, in which the handheld power tool 100 is in the screwing mode. The time t, or a quantity correlated with time, has been plotted on the abscissa x of FIG. 6*a*. In FIG. 6*b*, the signal of the operating quantity 200 is represented in transformed manner, it being possible, for instance, to effect transformation from time into a frequency by means of a fast Fourier transformation. For instance, the frequency f has been plotted on the abscissa x' of FIG. 6*b*, so that the amplitudes of the signal of the operating quantity 200 are represented. In FIGS. 6*c* and 6*d*, the second region 320 is represented, in which the handheld power tool 100 is in the rotary impact mode. FIG. 6*c* shows the measured signal of the operating quantity 200 plotted over time in the rotary impact mode. FIG. 6*d* shows the transformed signal of the operating quantity 200, the signal of the operating quantity 200 having been plotted over the frequency f as the abscissa x'. FIG. 6*d* shows characteristic amplitudes for the rotary impact mode.

Figure 7A:
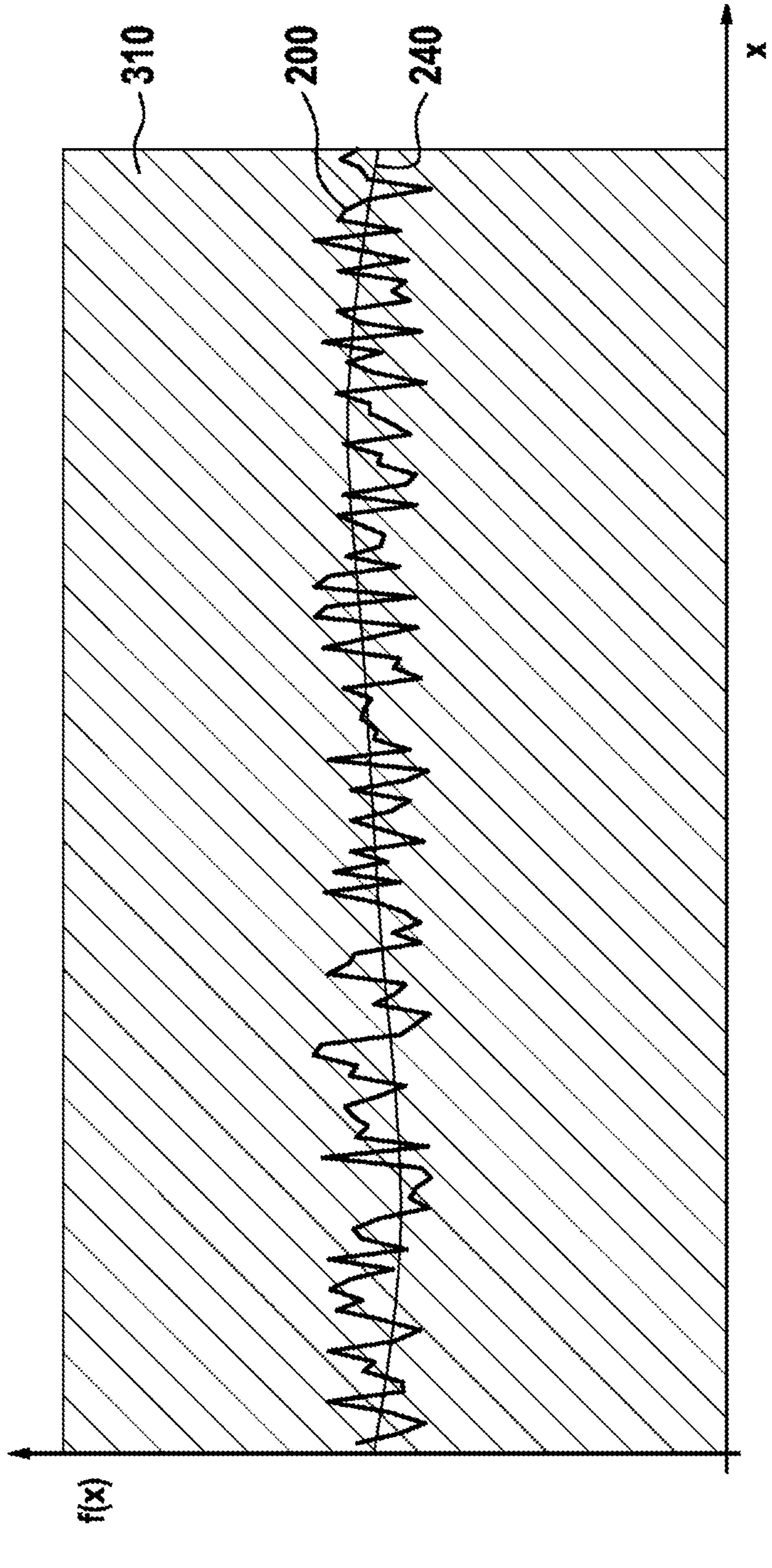
FIG. 7 a joint representation of a signal of an operating quantity and of a state-typical model signal for the parameter estimation.

FIG. 7*a* shows a typical case of a comparison by means of the comparative comparison method of parameter estimation between the signal of an operating quantity 200 and a state-typical model signal form 240 in the first region 310 described in FIG. 2. Whereas the state-typical model signal form 240 exhibits a substantially trigonometric progression, the signal of the operating quantity 200 has a progression deviating greatly therefrom. Regardless of the choice of one of the comparison methods described above, in this case the comparison that is implemented in method step S2 between the state-typical model signal form 240 and the signal of the operating quantity 200 has the result that the degree of concordance of the two signals is so low that in method step S3 the first operating state is not established.

Figure 7B:
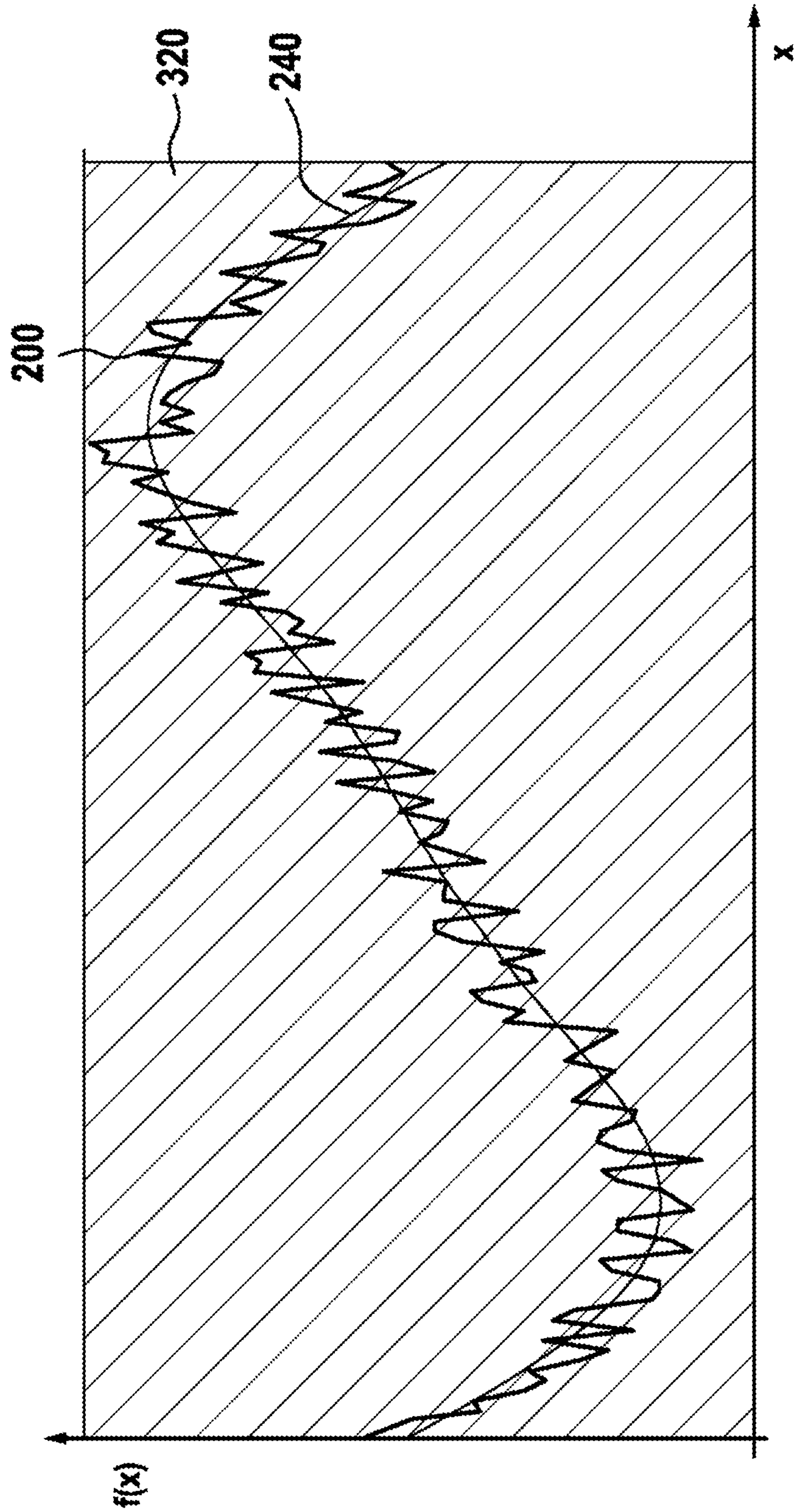

In FIG. 7*b*, on the other hand, the case is represented in which the first operating state is present and therefore the state-typical model signal form 240 and the signal of the operating quantity 200 exhibit a high degree of concordance overall, even if deviations can be established at individual points of measurement. Accordingly, in the comparative comparison method of parameter estimation the decision can be made as to whether the first operating state obtains.

Figure 8A:
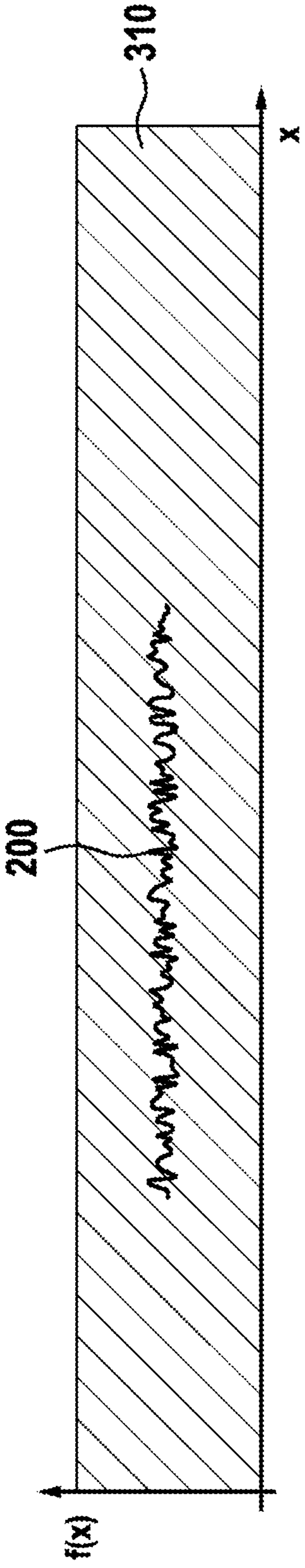
FIG. 8 a joint representation of a signal of an operating quantity and of a state-typical model signal for the cross-correlation.
Figure 8B:
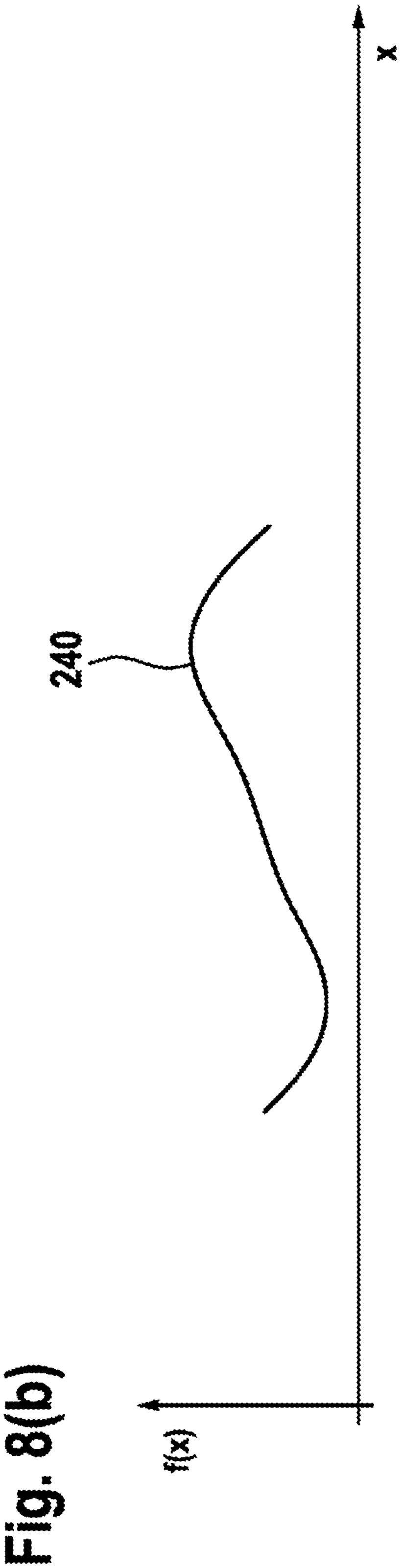
Figure 8C:
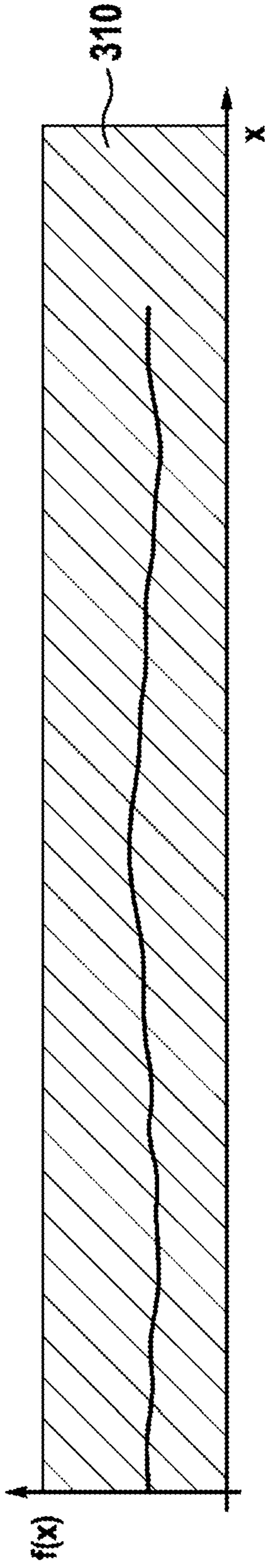
Figure 8D:
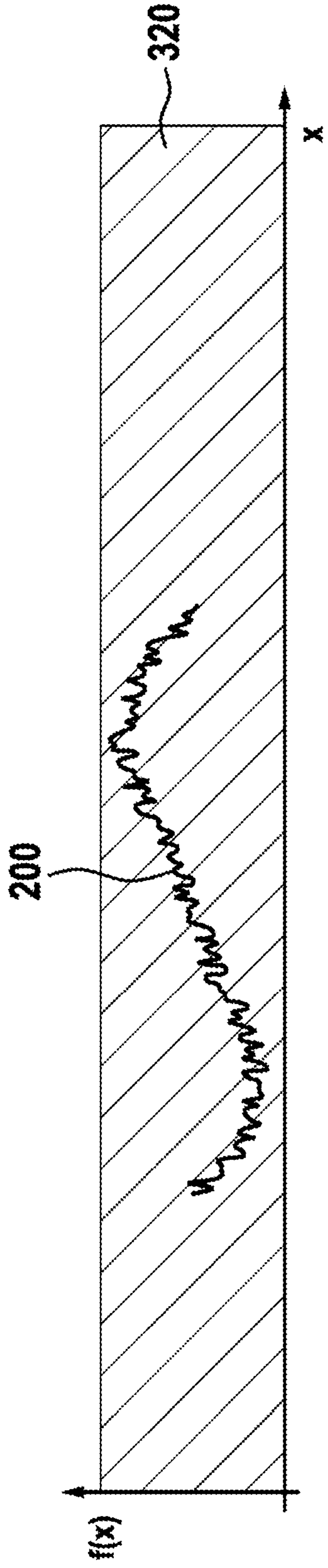
Figure 8E:
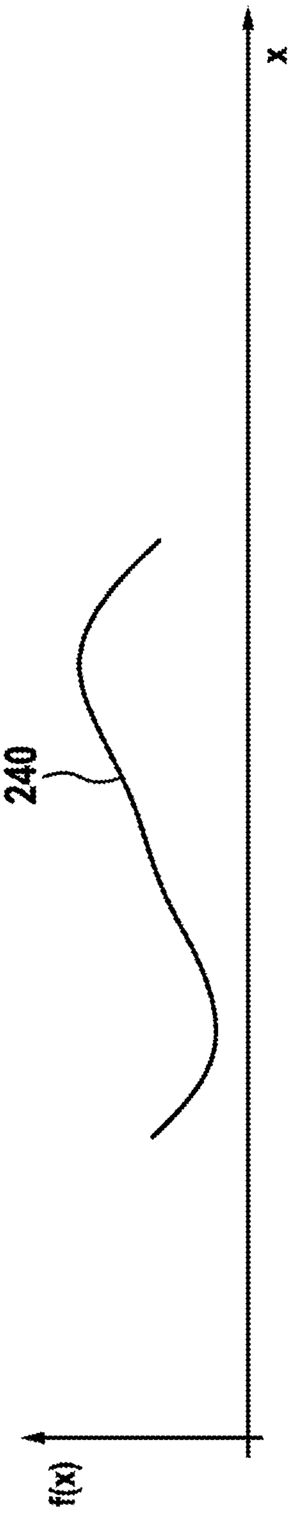
Figure 8F:
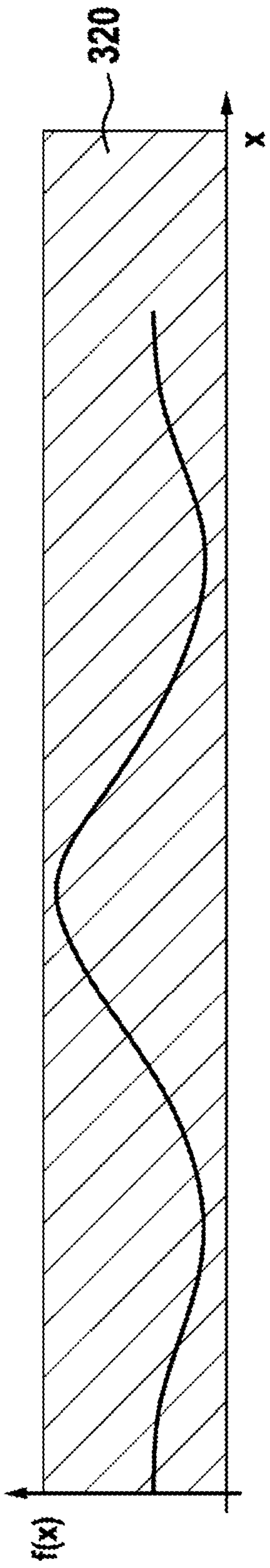

FIG. 8 shows the comparison of the state-typical model signal form 240, see FIGS. 8*b* and 8*e*, with the measured signal of the operating quantity 200, see FIGS. 8*a* and 8*d*, for the case where cross-correlation is used as comparative comparison method. In FIGS. 8*a-f*, the time, or a quantity correlating with time, have been plotted on the abscissa x. The first region 310, the screwing mode, is shown in FIGS. 8*a-c*. The second region 320, the first operating state, is shown in FIGS. 8*d-f*. As described above, the measured signal of the operating quantity, FIG. 8*a* and FIG. 8*d*, is correlated with the state-typical model signal form, FIGS. 8*b* and 8*e*. Respective results of the correlations are represented in FIGS. 8*c* and 8*f*. In FIG. 8*c*, the result of the correlation during the first region 310 is shown, wherein it can be discerned that a low concordance of the two signals obtains. In FIG. 8*c* the screwing mode therefore obtains. The result of the correlation during the second region 320 is shown in FIG. 8*f*. In FIG. 8*f* it can be discerned that a high concordance obtains, so the handheld power tool 100 is being operated in the first operating state.

The disclosure is not restricted to the exemplary embodiment described and represented; rather, it also encompasses all expert further developments within the scope of the disclosure.

In addition to the embodiments described and illustrated, further embodiments are conceivable which may encompass further modifications and also combinations of features.

The invention claimed is:

1. A method for detecting a first operating state of a handheld power tool having an electric motor, the method comprising:

ascertaining a signal of an operating quantity of the electric motor;

normalizing the signal of the operating quantity with at least one state-typical model signal form;

comparing the normalized signal of the operating quantity with the at least one state-typical model signal form to identify whether the state-typical model signal form is in the normalized signal of the operating quantity, the state-typical model signal form having been assigned to the first operating state; and detecting the first operating state depending at least partially on whether the state-typical model signal form is identified in the normalized signal of the operating quantity, wherein the state-typical model signal form, the pre-normalized signal of the operating quantity, and the normalized signal of the operating quantity represent the same operating quantity of the electric motor, wherein the state-typical model signal form is an oscillation curve, and wherein the normalization includes changing a wavelength of at least one of the pre-normalized signal of the operating quantity and the at least one state-typical model signal form so that the normalized signal of the operating quantity and the at least one state-typical model signal form have the same wavelength.

2. The method as claimed in claim 1, wherein one of (i) the operating quantity is a speed of the electric motor and (ii) the operating quantity correlates the speed of the electric motor.

3. The method as claimed in claim 1, the ascertaining further comprising:

recording the pre-normalized signal of the operating quantity as one of (i) a temporal progression of measured values of the operating quantity, and (ii) a temporal progression of measured values of a quantity of the electric motor that correlates with the temporal progression.

4. The method as claimed in claim 1, wherein:

the ascertaining further comprises recording the pre-normalized signal of the operating quantity as a temporal progression of measured values of the operating quantity, and the normalizing further includes transforming the temporal progression of the measured values of the operating quantity into a temporal progression of measured values of a quantity of the electric motor that correlates with the temporal progression of the measured values of the operating quantity.

5. The method as claimed in claim 1, the ascertaining further comprising:

storing the pre-normalized signal of the operating quantity as a sequence of measured values in a memory of the handheld power tool.

6. The method as claimed in claim 5, the ascertaining further comprising:

segmenting the sequence of measured values such that the pre-normalized signal of the operating quantity always comprises a predetermined number of measured values.

7. The method as claimed in claim 5, wherein the memory of the handheld power tool is a ring memory configured to overwrite oldest data with newest data.

8. The method as claimed in claim 1, the comparing further comprising:

comparing the normalized signal of the operating quantity with the state-typical model signal form using at least one of (i) a frequency-based comparison process and (ii) a comparative comparison process to determine whether at least one predetermined threshold value is satisfied.

9. The method as claimed in claim 8, wherein:

the normalized signal of the operating quantity is compared with the state-typical model signal form using the frequency-based comparison process, the frequency-based comparison process includes at least one of (i) bandpass filtering and (ii) frequency analysis, and the predetermined threshold value is at least 85% of a predetermined limiting value.

10. The method as claimed in claim 9, wherein the predetermined threshold value is at least one of (i) at least 90% of the predetermined limiting value and (ii) at least 95% of the predetermined limiting value.

11. The method as claimed in claim 8, wherein:

the comparative comparison process includes at least one of (i) parameter estimation and (ii) cross-correlation, and the predetermined threshold value is to at least 50% of a concordance of the normalized signal of the operating quantity with the state-typical model signal form.

12. The method as claimed in claim 1, wherein:

the comparing further comprises determining a quality of the identification of the state-typical model signal form in the normalized signal of the operating quantity; and the detecting further comprises detecting the first operating state at least partially based on the determined quality.

13. The method as claimed in claim 1, wherein:

the comparing further comprises determining a deviation of the identification of the state-typical model signal form in the normalized signal of the operating quantity; and the detecting further comprises detecting the first operating state at least partially based on the determined deviation.

14. The method as claimed in claim 1, the detecting further comprising:

detecting the first operating state based on less than ten impacts of an impact mechanism of the handheld power tool.

15. The method as claimed in claim 14, wherein the first operating state is identified based on at least one of (i) less than ten impact-oscillation periods of the electric motor, (ii) less than six impacts of the impact mechanism of the handheld power tool, in particular less than six impact-oscillation periods of the electric motor, (iii) less than four impacts of the impact mechanism of the handheld power tool, and (iv) less than four impact-oscillation periods of the electric motor.

16. The method as claimed in claim 1, wherein the handheld power tool is an impact wrench and the first operating state is an impact mode.

17. The method as claimed in claim 16, wherein the handheld power tool is a rotary impact wrench, and the first operating state is a rotary impact mode.

18. The method as claimed in claim 1, wherein the state-typical model signal form is a trigonometric oscillation curve.

19. A handheld power tool comprising:

an electric motor;

a pick-up configured to measure values of an operating quantity of the electric motor and a control unit configured to:

ascertain a signal of an operating quantity of the electric motor;

normalizing the signal of the operating quantity with at least one state-typical model signal form;

compare the normalized signal of the operating quantity with the at least one state-typical model signal form to identify whether the state-typical model signal form is in the normalized signal of the operating quantity, the state-typical model signal form having been assigned to a first operating state;

detect the first operating state depending at least partially on whether the state-typical model signal form is identified in the normalized signal of the operating quantity, wherein the state-typical model signal form, the pre-normalized signal of the operating quantity, and the normalized signal of the operating quantity represent the same operating quantity of the electric motor, wherein the state-typical model signal form is an oscillation curve, and wherein the normalization includes changing a wavelength of at least one of the pre-normalized signal of the operating quantity and the at least one state-typical model signal form so that the normalized signal of the operating quantity and the at least one state-typical model signal form have the same wavelength.

* * * * *